United States Patent
Perrin et al.

(10) Patent No.: US 10,633,797 B2
(45) Date of Patent: Apr. 28, 2020

(54) COMPOSITION AND METHOD FOR PRODUCING PRE-IMPREGNATED DECORATIVE BASE PAPER COMPRISING BIOPOLYMER NANOPARTICLES

(71) Applicant: AHLSTROM-MUNKSJOE DETTINGEN GmbH, Dettingen (DE)

(72) Inventors: Claude Perrin, Saint-Hilaire-de-la-Cote (FR); Helene Villaume, Rives (FR)

(73) Assignee: Ahlstrom-Munksjoe Dettingen GmbH, Dettingen (DE)

( * ) Notice: Subject to any disclaimer, the term of this patent is extended or adjusted under 35 U.S.C. 154(b) by 18 days.

(21) Appl. No.: 15/548,631

(22) PCT Filed: Feb. 4, 2015

(86) PCT No.: PCT/IB2015/050851
§ 371 (c)(1),
(2) Date: Aug. 3, 2017

(87) PCT Pub. No.: WO2016/124977
PCT Pub. Date: Aug. 11, 2016

(65) Prior Publication Data
US 2018/0002867 A1 Jan. 4, 2018

(51) Int. Cl.
| D21H 17/28 | (2006.01) |
| --- | --- |
| D21H 17/35 | (2006.01) |
| D21H 17/37 | (2006.01) |
| D21H 21/52 | (2006.01) |
| D21H 27/26 | (2006.01) |
| D21H 19/58 | (2006.01) |
| D21H 27/18 | (2006.01) |

(52) U.S. Cl.
CPC ............ *D21H 17/28* (2013.01); *D21H 17/35* (2013.01); *D21H 17/37* (2013.01); *D21H 19/58* (2013.01); *D21H 21/52* (2013.01); *D21H 27/18* (2013.01); *D21H 27/26* (2013.01); *B32B 2250/26* (2013.01); *B32B 2260/028* (2013.01); *B32B 2260/046* (2013.01); *B32B 2264/06* (2013.01); *B32B 2307/546* (2013.01); *B32B 2451/00* (2013.01); *B32B 2554/00* (2013.01)

(58) Field of Classification Search
CPC ........ D21H 19/58; D21H 19/54; D21H 27/26; D21H 17/28; D21H 17/35; D21H 17/37; D21H 19/44; D21H 27/18; B32B 2260/046; B32B 2250/26; B32B 2260/028; B32B 2262/062; B32B 2264/06; B32B 2307/546; B32B 2451/00; B32B 2554/00
See application file for complete search history.

(56) References Cited

U.S. PATENT DOCUMENTS

| | | | | |
| --- | --- | --- | --- | --- |
| 2,161,990 A * | 6/1939 | Asnes | ................ | B44C 3/085 427/172 |
| 3,335,017 A * | 8/1967 | Spencer | ................ | D21H 19/12 427/395 |
| 4,005,239 A * | 1/1977 | Davis | ................ | B32B 5/20 428/314.8 |
| 4,258,103 A * | 3/1981 | Hosmer | ................ | B32B 29/06 428/342 |
| 5,334,449 A * | 8/1994 | Bergmann | ................ | D21H 19/08 428/327 |
| 5,395,440 A * | 3/1995 | Trouve | ................ | C08G 12/12 106/287.25 |
| 6,677,386 B1 | 1/2004 | Giezen et al. | | |
| 6,825,252 B2 | 11/2004 | Helbling et al. | | |
| 6,921,430 B2 | 7/2005 | Bloembergen et al. | | |
| 7,160,420 B2 | 1/2007 | Helbling et al. | | |
| 8,182,839 B2 * | 5/2012 | Engelhardt | ................ | A61K 8/04 424/495 |
| 8,221,895 B2 * | 7/2012 | Wicher | ................ | B44C 1/10 428/532 |
| 8,349,464 B2 | 1/2013 | Wicher et al. | | |
| 8,449,665 B2 * | 5/2013 | Pal | ................ | B41M 5/5236 106/217.01 |
| 8,916,027 B2 * | 12/2014 | Wicher | ................ | D21H 27/26 162/168.7 |
| 9,011,741 B2 * | 4/2015 | Wildi | ................ | C08B 31/003 264/141 |
| 9,580,846 B2 * | 2/2017 | Tseitlin | ................ | C08J 5/24 |
| 9,616,696 B2 * | 4/2017 | Di Risio | ................ | B41M 5/5245 |
| 2004/0175590 A1* | 9/2004 | Distler | ................ | D21H 19/58 428/511 |
| 2004/0241382 A1 | 12/2004 | Bloembergen et al. | | |
| 2005/0061203 A1* | 3/2005 | Helbling | ................ | C09D 103/04 106/145.1 |
| 2010/0183890 A1* | 7/2010 | Wicher | ................ | D21H 27/20 428/514 |

(Continued)

FOREIGN PATENT DOCUMENTS

| CA | 2745303 A1 * | 6/2010 | ........... C08B 31/003 |
| --- | --- | --- | --- |
| CN | 101903596 A | 12/2010 | |

(Continued)

OTHER PUBLICATIONS

International Search Report dated Oct. 7, 2015 in PCT/IB2015/050851 filed Feb. 4, 2015.
Office Action dated Jul. 2, 2019 in Chinese Application No. 201580075500 4 (with English Translation).
Laine et al: Hydroxyalkylated xylans—Their synthesis and application in coatings for packaging and paper. Science Direct, vol. 44, Jan. 2013, pp. 692-704.

(Continued)

*Primary Examiner* — Jose A Fortuna
(74) *Attorney, Agent, or Firm* — Laine IP Oy

(57) ABSTRACT

A pre-impregnated decorative base paper for decorative coating materials, comprising biopolymer nanoparticles.

25 Claims, No Drawings

(56) References Cited

U.S. PATENT DOCUMENTS

| | | | | |
|---|---|---|---|---|
| 2010/0310894 A1* | 12/2010 | Wicher | ..................... | B44C 1/10 |
| | | | | 428/537.5 |
| 2011/0042841 A1 | 2/2011 | Wildi et al. | | |
| 2012/0164444 A1* | 6/2012 | Kinoshita | ......... | B29C 45/14811 |
| | | | | 428/337 |
| 2012/0263894 A1 | 10/2012 | Bloembergen | | |
| 2012/0325418 A1* | 12/2012 | Wicher | .................. | D21H 27/26 |
| | | | | 162/135 |
| 2015/0068659 A1* | 3/2015 | Stawicka | ................ | B41M 5/52 |
| | | | | 156/60 |
| 2018/0002867 A1* | 1/2018 | Perrin | .................... | D21H 27/26 |

FOREIGN PATENT DOCUMENTS

| | | | | |
|---|---|---|---|---|
| CN | 102300908 A | 12/2011 | | |
| CN | 102837554 A | 12/2012 | | |
| CN | 103717661 A | 4/2014 | | |
| EP | 0 648 248 A1 | 4/1995 | | |
| EP | 0 648 248 B1 | 11/1996 | | |
| EP | 1 380 209 B1 | 4/2006 | | |
| GB | 506612 A * | 6/1939 | ............. | B44C 3/085 |
| WO | 94/00523 A1 | 1/1994 | | |
| WO | WO 9735890 A1 | 10/1997 | | |
| WO | WO 0005973 A1 | 2/2000 | | |
| WO | WO-2010065750 A1 * | 6/2010 | ........... | C08B 31/003 |
| WO | WO 2013119521 A1 | 8/2013 | | |

OTHER PUBLICATIONS

Xiao et al: Paper and board pigment coating raw materials—A review of some recent innovative novelties. Advanced Materials Research, vols. 602-604, 2013, pp. 1617-1623.

* cited by examiner

COMPOSITION AND METHOD FOR PRODUCING PRE-IMPREGNATED DECORATIVE BASE PAPER COMPRISING BIOPOLYMER NANOPARTICLES

The present invention relates to a pre-impregnated decorative base paper, also referred to as "prepreg" or "prip", and decorative coating materials obtainable therefrom.

Decorative papers in general are used to cover surfaces in furniture manufacturing and in interior fitting.

There exists two categories of decorative papers, namely on the one hand papers for high pressure laminates (HPL) or low pressure laminates (LPL), and on the other hand pre-impregnated papers for foil applications.

Papers for HPL or LPL are decorative papers that are made on a paper machine, printed, and impregnated off-line.

High pressure laminates are laminates which are formed by pressing together several impregnated papers stacked on top of one another. In general, such high pressure laminates are constituted by an uppermost transparent overlay which produces surface resistance, the resin-impregnated decorative paper and one or more impregnated phenolic resin-Kraft papers. The underlay is, for example, particle board or wood chipboard, or even plywood.

In case of low pressure laminates, the decorative paper impregnated with synthetic resin is pressed directly onto an underlay, for example particle board, using low pressure.

In HPL or LPL, the resin content of the impregnated paper is relatively high, about the same weight of resin as paper, and the resin is of use to the adhesion between the impregnated papers or on the underlay.

Prepregs should be distinguished from these impregnated papers for HPL or LPL, because the paper is resin impregnated on line on the paper machine, then printed and lacquered.

In pre-impregnated papers, the resin content is not as high as in impregnated papers for HPL or LPL, and a glue must be used to make the paper adhere to the underlay.

The impregnation of papers to make pre-impregnated papers is carried out on both faces of the paper in a symmetrical manner. The top face is the one that will be printed and lacquered and the bottom face is the one that will be glued to the underlay.

A good lacquering requires that the lacquer remains mostly at the surface of the paper to obtain a smooth and glossy surface.

On the contrary, gluing requires that the glue penetrates into the paper more deeply to achieve high resistance against delamination.

Generally speaking, to get a good lacquer hold out, a closed surface is desirable and to get a good gluability, an open structure is desirable.

Pre-impregnates must accordingly meet these specific two opposite requirements in a satisfactory manner. This is typically achieved by using a pre-impregnating composition that has a latex copolymer component and a water soluble component.

In addition, pre-impregnates should preferably satisfy other properties desirable for decorative papers in general, which include high opacity to improve covering of the underlay, uniform sheet formation and grammage of the sheet for uniform resin uptake, high light-fastness, high purity and uniformity of colour for good reproducibility of the pattern to be printed, high wet strength for a smooth impregnation procedure, an appropriate absorbency in order to obtain the required degree of resin saturation, and dry strength, which is important in rewinding operations in the paper machine and for printing in the printing machine, good internal bond, good printability and the paper must not fray during processing steps such as sawing or drilling.

An example of a pre-impregnated decorative base paper is disclosed in U.S. Pat. No. 8,349,464 B2. It comprises a base paper that is impregnated with an impregnating resin comprising at least one polymer latex and a solution of thermally or oxidatively degraded starch with a specific molecular weight distribution and a polydispersity index Mw/Mn of 6 to 23.

Other pre-impregnated decorative base papers are disclosed in EP 0 648 248 B1, in which the impregnating composition comprises a dispersion of styrene-ethyl acrylate-butyl acrylate copolymer and an aqueous composition of a binder chosen from polyvinyl alcohol (PVOH), polyvinyl acetate (PVAc), gelatin and starch. A preferred composition comprises 50 parts by weight of a polyvinyl alcohol solution at between 5 to 15% and 50 parts by weight of a styrene-ethyl acrylate-butyl acrylate copolymer dispersion.

Starch is a complex carbohydrate polymer which is insoluble in water in its native form. It must be solubilized to act as a binder in pre-impregnated paper applications. It can be in its high molecular weight native form (but then gels at very low concentrations), or preferably in modified form where the molecular weight is typically significantly reduced. A common example is ethylated starches, which contain a certain low level of hydroxyethyl functionalities and resultant modified starches have much reduced molecular weights. Many other modified starches are known, including phosphate, acid-thinned, and thermally modified starches. These native and modified starches must be cooked in order to provide a soluble starch solution. Some highly modified or pregelatinized (used in food applications) starches may be at least partially cold soluble, while most commercial modified starches must be cooked to provide a starch solution. Starch is often found in the fruit, seeds, or tubers of plants. The four major resources for starch production are corn, potatoes, wheat, and rice.

Starch is a mix of two polymeric carbohydrates (polysaccharides) called amylose and amylopectin.

The relative content of amylose and amylopectin varies between species.

Fragmented starch is described in EP 1 360 209 B 1.

U.S. Pat. No. 6,677,386 discloses a process for producing biopolymer nanoparticles, in which the biopolymer is plasticized using shear forces, a crosslinking agent preferably being added during the processing. After said processing, the biopolymer nanoparticles can be dispersed in an aqueous medium to a concentration between 4 and 40 wt. %. This results in biopolymer nanoparticles which are typically characterized by an average particle size of less than 400 nm. In one embodiment of this '386 invention, the biopolymer is starch. Some uses of the nanoparticles of U.S. Pat. No. 6,677,386 can be found in: (i) U.S. Pat. No. 7,160,420 which describes the use of the biopolymer nanoparticles as a wet-end additive in papermaking pulp slurry, or applied to the surface of the paper as a surface sizing agent; (ii) U.S. Pat. No. 6,825,252 which describes the use of the biopolymer nanoparticles in a binder in a pigmented paper coating composition; (iii) U.S. Pat. No. 6,921,430 which describes the use of the biopolymer nanoparticles in environmentally friendly adhesives; and (iv) U.S. Patent Application Publication No. 2004/0241382 which describes the use of the biopolymer nanoparticles in an adhesive for producing corrugated board.

There exists a need to further improve pre-impregnated decorative base papers in order to lower the amount of synthetic resin in the impregnating composition, preferably while keeping good printability, good lacquering, good gluability and other desired properties, or to avoid the need for a water soluble binder, or both.

The invention aims at satisfying this need as a result of a pre-impregnated decorative base paper for decorative coating materials, comprising biopolymer based nanoparticles.

A new pre-impregnated decorative base paper described herein is obtained by impregnating a decorative base paper with an impregnating composition, which is a latex comprising 1) petroleum based polymer particles, and 2) biopolymer nanoparticles. The petroleum based polymer is selected from the group consisting of latex polymers including but not limited to styrene copolymers, styrene acrylate copolymers, styrene butyl acrylate copolymers, styrene butyl acrylate acrylonitrile copolymers, and vinyl acrylic copolymers, and mixtures thereof. The biopolymer nanoparticles are preferably selected from those of the 6,677,386 patent and related publications as described above. The biopolymer nanoparticles are optionally characterized by one or more attributes, such as low-viscosity high-solids dispersion in water, having a dominant size range less than 400 nm, having a polydispersity index (Mw/Mn) of less than or equal to 2 as determined by gel permeation chromatography (GPC), or having a molecular weight of 1,000,000 Da or more. In some embodiments of the present invention, the biopolymer is starch. GPC analysis was conducted using a PL220 GPC system equipped with a differential refractometer and light scattering detector (measures light scattering at 90° and 15°). The GPC was equipped with the following columns (in series): 1 guard column, 1 High MW mixed column (separation range 500 Da-10,000,000 Da) Agilent PLgel 10 µm Mixed B. The mobile phase was 0.05 M LiBr in DMSO at 70° C. For system calibration, the differential refractometer and light scattering detectors were calibrated using a Pullulan 110K standard purchased from American Polymer Standards. Data was collected and analyzed using Cirrus Multi software version 3.4.1. Percent Below "X"K was calculated as: (Σconcentration response less than "X"K from Log M fit/Σ concentration response of recovered sample)×100%. The following sample preparation protocol was used: Samples were dissolved in the mobile phase at a concentration of 1.0 mg/mL, heated overnight at 65° C., filtered over a 0.45 micron Teflon membrane filter, and 100 µL injections were made in triplicate for each sample. For analysis, molecular weight calculations were based on dn/dc=0.066, the literature value for amylopectin in DMSO.

Pre-impregnated decorative base papers according to the invention may be lower cost, easier to prepare or provide for more environmentally responsible alternatives to produce because the presence of the biopolymer based nanoparticles in the impregnating composition, which allows one to reduce the amount of a petroleum based polymer latex binder in the impregnating composition or the amount of a water soluble or petroleum based co-binder or both.

Surprisingly, the pre-impregnated papers made in accordance with the invention meet satisfactorily two very different and normally opposing requirements for good gluability and good lacquering, whilst maintaining good internal cohesion. Also very unexpectedly, at least some pre-impregnated papers made in accordance with the invention satisfactorily meet all quality requirements even when the soluble binder component such as PVOH is eliminated. Relative to the preferred formulation in EP0648248, the optional partial petroleum based latex binder replacement with the biopolymer nanoparticles, combined with the total replacement of the PVOH binder, produces unexpected results especially given that PVOH is known to have more than twice the binding strength of the petroleum based latex binder.

The dry weight ratio of biopolymer nanoparticles to petroleum based polymer(s) is preferably in the range of 20:80 to 80:20, more preferably 40:60 to 70:30.

Furthermore, exemplary embodiments of the invention show good stiffness resulting from the inclusion of the biopolymer nanoparticles. Improved stiffness is particularly advantageous for laminates in sheets and not in rolls.

During the process, the risk of accumulation of dirt build-up is reduced after drying of the impregnation composition, because of the biopolymer nanoparticle content of the impregnation composition. This is another significant and totally unanticipated optional advantage of the present invention.

Biopolymer Nanoparticles.

The nanoparticles are made from a biopolymers including but not limited to starch that may be native starch, or modified starch, proteins, other biobased materials, or mixtures thereof.

The biopolymer nanoparticles are preferably produced by a reactive extrusion process as described in U.S. Pat. No. 6,677,386 and US 2011042841.

In one preferred embodiment of the present invention, the biopolymer is starch. The starch is preferably native starch. The starch may be previously modified, e.g. with cationic groups, carboxymethyl groups, by acylation, phosphorylation, hydroxyalkylation, oxidation and the like. Mixtures of starches may be used, or mixtures of starch with other biopolymers, those containing at least 50% starch being preferred. Especially preferred is high-amylopectin starch such as low-amylose starch, i.e. starch having a content of at least 75%, especially at least 90% of amylopectin, such as waxy starch.

The starch may be selected from tuber and root starches, as well as corn starches, tuber flour, root flour and corn flour. The tuber or root starch may be selected from the group consisting of potato starch and tapioca starch. The starch may be selected from the group consisting of maize starch and wheat starch.

The average size $D_{50}$ in number of the biopolymer nanoparticles is preferably less or equal than 1000 nm, more preferably less than or equal to 400 nm as measured by Nanoparticle Tracking Analysis (NTA). NTA was performed using a NanoSight LM20 unit equipped with a microscope, a digital camera, a blue laser and NanoSight NTA 2.3 software. The target concentration used for dispersions of samples was 0.01% (w/w). Typically a minimum 30-60 s video clip was sufficient for sample analysis, but longer times may be used for increased accuracy. The NTA microscope provides a method of visualizing, tracking and analyzing a sampling of individual particles (as opposed to the typical averaged global response as, for example, in dynamic light scattering), by correlating their Brownian motion (the actual speed of which relates to particle size, i.e. faster meaning smaller particles), and calculating their diffusion coefficient to provide the particle size and size distribution for that sampling of particles. The particles contained in the dispersion are visualized by the light they scatter when illuminated by the laser light source. The scattered light is captured by the digital camera, and the motion of each particle is tracked from frame to frame by the software. The particle size (sphere equivalent hydrodynamic radius) is calculated by substituting the rate of particle movement via the Stokes-Einstein equation.

The molecular weight polydispersity index Mw/Mn of the nanoparticles is preferably less than or equal to 2 as determined by GPC. The average molecular weight of the biopolymer nanoparticles is preferably at least 1,000,000 Da.

To obtain the nanoparticles, a starch based material may be processed, preferably extruded, at a temperature of between 40° C. and 200° C., for example between 100° C. and 200° C., a crosslinking agent preferably being present during the processing, and the starch based material preferably being dissolved or dispersed in a hydroxylic solvent during the processing, the starch based material being submitted during the processing to shear forces preferably corresponding to a mechanical energy input of at least 100 J/g starch based material, more preferably at least 400 J/g, the starch based material preferably having a dry substance content during the processing of at least 50% by weight. The crosslinking agent may be, for example, a dialdehyde or polyaldehyde, such as glyoxal. U.S. Pat. No. 6,677,386, and US 2011042841, the contents of which are incorporated by reference, disclose a process to produce biopolymer nanoparticles used in accordance with the invention.

Method for Producing the Pre-Impregnated Decorative Base Paper

A further object of the present invention is a method for producing the pre-impregnated decorative base paper of the invention, as defined above, comprising impregnating a decorative base paper with an impregnating composition comprising a dispersion of biopolymer nanoparticles.

An exemplary impregnating composition has a relatively low viscosity and a relatively high solid content. An unexpected further advantage of this embodiment is a good runnability on the decorative paper machine despite such high solid contents.

The decorative base paper preferably has before impregnation a Bendsten porosity ranging from 100 to 1500 mL/min, preferably 300 to 1000. The porosity is measured in accordance to NF ISO 5636-3.

The impregnating composition preferably is an aqueous composition, and preferably comprises a petroleum based polymer latex binder and the biopolymer nanoparticles, the petroleum based polymer preferably being selected from the group consisting of latex polymers including but not limited to styrene copolymers, styrene acrylate copolymers, styrene butyl acrylate copolymers, styrene butyl acrylate acrylonitrile copolymers, and styrene acrylics derivate copolymers, and mixtures thereof, the weight ratio dry of biopolymer nanoparticles to the petroleum based polymer(s) preferably being in the range of 20:80 to 80:20, most preferably 40:60 to 70:30

The impregnating solution preferably is obtained by mixing an aqueous dispersion of the biopolymer nanoparticles with a petroleum based polymer latex binder. The solid content of the biopolymer nanoparticles dispersion is preferably to 15 to 35% of the total weight of said aqueous dispersion, most preferably to 25 to 35%, said aqueous dispersion preferably being prepared by adding 4 to 6% of urea by weight of the biopolymer nanoparticles.

The viscosity of the impregnating composition at 23° C. is preferably 150 mPa·s or less, preferably from about 40 to about 100 mPa·s at 25% solids measured with a Brookfield Viscometer at 100 rpm and using spindle N° 2.

The dry solid contents of the impregnating composition ranges preferably from 20 to 40%, preferably from 25 to 35%.

The decorative base paper is treated with the impregnating composition such that the dry weight of the impregnating composition ranges from 10 to 25% of the weight of the decorative base paper, preferably from about 15 to about 20%.

A further object of the invention is a decorative coating material comprising the pre-impregnated decorative base paper of the invention, as described above, or produced by the method as described above.

EXAMPLES

The following examples serve to illustrate the invention and are not intended to limit the invention in any way. Indeed, various modifications of the invention in addition to those shown and described herein will become apparent to those skilled in the art from the foregoing description and the following examples and fall within the scope of the appended claims. Tests have been carried out to assess properties of pre-impregnated decorative base papers made in accordance with the invention, compared to comparative examples.

The lacquer used is the 5364.1 mixed with the hardener 9021.2 both of which were obtained from the company Plantag.

Control Example A

This pre-impregnated paper is made in accordance with the teaching of EP 0,648,248 B1 using an all-synthetic petroleum based binder system, including a main latex binder and a water soluble polyvinyl alcohol (PVOH) cobinder.

Control Example B

This pre-impregnated paper is made in accordance with the teaching of U.S. Pat. No. 8,349,464 with the starch referenced 07311 of the company CARGILL. The starch is prepared at 25% weight solid contents.

The dry weight ratio of starch/polymer latex in this example is 60:40.

Control Example C

This pre-impregnated paper is made in accordance with the teaching of U.S. Pat. No. 8,349,464 with the starch referenced 07325 supplied by the company CARGILL. The starch is prepared at 25% weight solid contents.

The dry weight ratio of starch/polymer latex in this example is 60:40.

Example 1 to 4

Examples 1 to 4 are made in accordance with the invention, with respective ratios of 80:20, 60:40, 40:60 and 20:80 of biopolymer nanoparticles (supplied by the company Eco-Synthetix Corporation) with respect to polymer latex. The aqueous latex dispersion of biopolymer nanoparticles is prepared at 35.7% weight solid contents.

For all the examples, the details of the impregnating compositions are given in the table below.

The proportions are weight proportions, unless specified otherwise.

The base paper is made from a fibrous composition of 100% eucalyptus pulp or comprising at the most 20% of long fibers of 58 gsm. The refining is about 30° SR and is adjusted so as to have a Bendsten porosity before impregnation of 100 to 1000 mL/min. Titanium dioxide is added up to 23% ash content, and a wet resistance agent such as epichlorohydrine is added between 0.3% and 1% dry versus the base paper.

This base paper is treated on line, with the impregnating composition applied using a size press and then dried at 120° C. to a moisture level of 2.5%.

|  | Control Example A | Control Example B | Control Example C | Example 1 | Example 2 | Example 3 | Example 4 |
|---|---|---|---|---|---|---|---|
| Biobased Binder % | 0% | 60% | 60% | 80% | 60% | 40% | 20% |
| Water | 10.4 | 115.0 | 80.0 | 80.0 | 85.0 | 101.0 | 115.0 |
| Cargill 07311 |  | 240.0 |  |  |  |  |  |
| Cargill 07325 |  |  | 240.0 |  |  |  |  |
| Biopolymer nanoparticles (1) |  |  |  | 224.1 | 168.1 | 112.0 | 56.0 |
| Polymer latex (2) | 160 | 80.0 | 80.0 | 40.0 | 80.0 | 120.0 | 160.0 |
| PVOH (3) | 200 |  |  |  |  |  |  |
| Solid content | 27.0 | 23.0 | 25.0 | 29.1 | 30.0 | 30.0 | 30.2 |
| Viscosity 100 trs (cps) | 60 | 200 | 65 | 75 | 70 | 50 | 40 |
| Pick up %/treated paper | 19.7 | 16.6 | 19.3 | 18.7 | 20.0 | 21.7 | 20.3 |
| Bendtsen porosity (ml/min) | 15 | 64 | 124 | 138 | 121 | 76 | 40 |
| Internal bond SM (J/m$^2$) | 2400 | 1150 | 1200 | 1200 | 2200 | 2300 | 2400 |
| Water cobb 1 min Top side/Back side (gsm) | 13.8/ 14.7 | 20.7/ 21.2 | 18.9/ 19.7 | 31.0/ 33.7 | 23.7/ 25.2 | 17.6/18 | 13.5/14.3 |
| Tesa test | 1 | 5 | 3 | 3 | 1 | 1 | 1 |
| Gloss 60° 8 gsm of lacquer (%) | 29.4 | 28.3 | 27.1 | 28.4 | 27 | 29.1 | 29.8 |
| Gluability | Poor | very good | very good | very good | very good | good | medium |

(1) Starch nanoparticles, grade DuraBind™ 3356, were obtained from EcoSynthetix Corporation.
(2) Aqueous dispersion with 50% weight solid contents of a heat-crosslinking copolymer of n-butyl acrylate and styrene sold under reference Acronal S305D by the company BASF.
(3) Polyvinyl alcohol from the company KURARAY sold under reference Mowiol 4/98, with 10% weight solid contents.

Example 2 shows over Control Example B and C that with similar contents of polymer latex the internal bond is significantly improved.

Example 1 shows over Control Example B and C that with comparable internal bond the amount of polymer latex can be significantly reduced.

Examples made in accordance with the invention show improved gluability with respect to Control Example A.

The examples made according to the invention also show acceptable viscosity for processing.

The tests show that the pre-impregnated decorative base paper in accordance with the invention exhibit good results for gluability, gloss and internal bond. What is quite surprising is to get an excellent compromise between the two opposing key properties of gluability and lacquer hold out, by using the biopolymer nanoparticles. Furthermore, equally surprising is the high level of petroleum based latex binder replacement with the biopolymer nanoparticles, combined with the total elimination of the PVOH cobinder. This is totally unexpected especially given that PVOH is known to have more than twice the binding strength of the petroleum based latex binder. Furthermore, these results demonstrate that this performance is not achieved using water-soluble starches.

The invention is not limited to the disclosed embodiments. For example, biopolymer nanoparticles other than those made in accordance with U.S. Pat. No. 6,677,386 could be used.

The invention claimed is:

1. A pre-impregnated decorative base paper for decorative coating materials, wherein the pre-impregnated decorative base paper comprises a decorative base paper impregnated with an impregnating composition comprising a petroleum based polymer latex binder and biopolymer nanoparticles, wherein a dry weight ratio of biopolymer nanoparticles to petroleum based polymer latex binder is in a range of 20:80 to 80:20, wherein the biopolymer nanoparticles are non-water soluble, and wherein a molecular weight polydispersity index Mw/Mn of the biopolymer nanoparticles is less than or equal to 2 as measured by Gel Permeation Chromatography.

2. The pre-impregnated base paper of claim 1, wherein the petroleum based polymer latex binder is selected from the group consisting of styrene butyl acrylate copolymers, styrene butyl acrylate acrylonitrile copolymers, styrene acrylics derivate copolymers, and mixtures thereof.

3. The pre-impregnated decorative base paper of claim 1, wherein the biopolymer nanoparticles are made up of at least 50% starch.

4. The pre-impregnated decorative base paper of claim 3, wherein the starch is processed at a temperature of between 40° C. and 200° C., a crosslinking agent being present during the processing, and the starch being submitted during the processing to shear forces.

5. The pre-impregnated decorative base paper of claim 3, wherein the starch is extruded at a temperature of between 40° C. and 200° C., a crosslinking agent being present during the extruding, and the starch is dissolved or dispersed in a hydroxylic solvent during the extruding, the starch being submitted during the extruding to shear forces.

6. The pre-impregnated decorative base paper of claim 1, wherein an average size $D_{50}$ in number of the biopolymer nanoparticles is less than or equal to 1000 nm as measured by Nanoparticle Tracking Analysis.

7. The pre-impregnated decorative base paper of claim 1, where the biopolymer nanoparticles comprise one or more types of starch.

8. The pre-impregnated decorative base paper according to claim 1, wherein a weight ratio dry of biopolymer nanoparticles to petroleum based polymer latex binder is in a range of 40:60 to 70:30.

9. The pre-impregnated decorative base paper of claim 1, wherein an average size $D_{50}$ in number of the biopolymer nanoparticles is less than or equal to 400 nm as measured by Nanoparticle Tracking Analysis.

10. The pre-impregnated decorative base paper of claim 1, wherein the biopolymer nanoparticles comprise an average molecular weight of at least 1,000,000 Da.

11. The pre-impregnated decorative base paper of claim 1, wherein the biopolymer nanoparticles comprise one or more types of starch selected from the group consisting of a native corn starch, a tubular starch, a chemically modified starch, and mixtures thereof.

12. A method for producing the pre-impregnated decorative comprising:
impregnating a decorative base paper with an impregnating composition comprising a petroleum based polymer latex binder and biopolymer nanoparticles,
wherein a dry weight ratio of biopolymer nanoparticles to petroleum based polymer latex binder is in a range of 20:80 to 80:20, wherein the biopolymer nanoparticles are non-water soluble, and wherein a molecular weight polydispersity index Mw/Mn of the biopolymer nanoparticles is less than or equal to 2 as measured by Gel Permeation Chromatography.

13. The method of claim 12, the decorative-base paper having before impregnation a Bendsten porosity ranging from 100 to 1500 mL/min.

14. The method of claim 12, wherein the petroleum based polymer is selected from the group consisting of styrene copolymers, styrene acrylate copolymers, styrene butyl acrylate copolymers, styrene butyl acrylate acrylonitrile copolymers, styrene acrylics derivate copolymers, and mixtures thereof.

15. The method of claim 14, wherein a dry weight ratio of biopolymer nanoparticles to the petroleum based polymer(s) is in the range of 20:80 to 80:20.

16. The method of claim 14, wherein the dry weight ratio of biopolymer nanoparticles to the petroleum based polymer(s) is in a range of 40:60 to 70:30.

17. The method of claim 14, the impregnating solution being obtained by mixing an aqueous dispersion of the biopolymer nanoparticles with the petroleum based polymer latex binder, a solid content of the biopolymer nanoparticles dispersion being 25 to 35% of a total weight of said aqueous dispersion, said aqueous dispersion being prepared by adding 4% to 6% of urea by weight of the biopolymer nanoparticles.

18. The method of claim 14, wherein the impregnating solution is obtained by mixing an aqueous dispersion of the biopolymer nanoparticles with the petroleum based polymer latex binder, wherein a solids content of the aqueous dispersion is 15 to 35% of a total weight of said aqueous dispersion.

19. The method of claim 12, the viscosity-of the impregnating composition at 23° C. being 150 mPa·s or less.

20. The method of claim 19, wherein a viscosity-of the impregnating composition at 23° C. is from 40 to about 100 mPa·s.

21. The method of claim 12, wherein a dry solids content of the impregnating composition ranges from 20 to 40%.

22. The method of claim 21, wherein a dry solids content of the impregnating composition ranges from 25 to 35%.

23. The method of claim 12, wherein the decorative base paper is treated with a quantity of the impregnating composition such that a dry weight of the impregnating composition ranges from 10 to 25% of a weight of the decorative base paper.

24. The method of claim 23, wherein the decorative base paper is treated with a quantity of the impregnating composition such that a dry weight of the impregnating composition ranges from 15 to 20% of a weight of the decorative base paper.

25. The method of claim 12, the decorative base paper having before impregnation a Bendsten porosity ranging from 300 to 1000 mL/min.

* * * * *